United States Patent [19]
Killian et al.

[11] Patent Number: 5,574,723
[45] Date of Patent: * Nov. 12, 1996

[54] REMOTE PROVISIONING OF TELEPHONE CHANNEL UNIT USING INBAND DIGITAL CODE SEQUENCES TRANSMITTED OVER TANDEM LINK

[75] Inventors: Stephen T. Killian, Huntsville; Jeffrey B. Wells, Madison, both of Ala.

[73] Assignee: Adtran, Huntsville, Ala.

[*] Notice: The term of this patent shall not extend beyond the expiration date of Pat. No. 5,390,179.

[21] Appl. No.: 302,590

[22] Filed: Sep. 8, 1994

Related U.S. Application Data

[63] Continuation of Ser. No. 813,346, Dec. 24, 1991, Pat. No. 5,390,179.
[51] Int. Cl.$^6$ .................................................. H04S 3/00
[52] U.S. Cl. ................................. 370/68.1; 370/110.1
[58] Field of Search ............................ 379/5, 9, 10, 14, 379/15, 219, 220, 224, 227, 230; 370/68.1, 110.1

[56] References Cited

U.S. PATENT DOCUMENTS

| | | | |
|---|---|---|---|
| 4,675,862 | 6/1987 | Bonzi, Jr. et al. | 370/15 |
| 4,688,209 | 8/1987 | Bonzai, Jr. et al. | 370/15 |
| 4,849,972 | 7/1989 | Hackett et al. | 370/110.1 |
| 5,197,068 | 3/1993 | Holein et al. | 370/110.4 |
| 5,237,563 | 8/1993 | McNulty | 370/58.1 |

*Primary Examiner*—Jeffery Hofsass
*Assistant Examiner*—Daniel S. Hunter
*Attorney, Agent, or Firm*—Charles E. Wands

[57] ABSTRACT

To remotely interrogate a telecommunications services channel unit resident in any office along a tandem network communication link, a control link establishment code sequence comprised of one or more sets of predefined digital code bytes is transmitted from a test system controller. The format of the control link establishment sequence is such that as it is forwarded down the link, any tandem channel unit or units that are intermediate the test system controller and the destination channel unit will transition to a transparent state, so that only the destination channel unit will be able transition to an interrogation, response mode. During the command-response mode, channel units connected in tandem between the selected channel unit and the interrogating test system controller continue to assume a transparent state, so that command and response messages propagate unmodified through such intermediate channel units. A command message may contain information for defining the operational configuration of the selected channel unit. It may be used to read the operational configuration or status of the selected channel unit, or it may contain supervisory control information for directing the selected channel unit to conform with a prescribed operational condition.

37 Claims, 5 Drawing Sheets

.....<SOM><COMMAND_TYPE><DATA_1><DATA_2> - <DATA_N><EOM>.....

REMOTE PROVISIONING OF TELEPHONE CHANNEL UNIT USING INBAND DIGITAL CODE SEQUENCES TRANSMITTED OVER TANDEM LINK

This is a continuation of application Ser. No. 07/813,346, filed Dec. 24, 1991, now U.S. Pat. No. 5,390,179, issued Feb. 14, 1995.

FIELD OF THE INVENTION

The present invention relates in general to telephone communication systems and is particularly directed to a mechanism for establishing a virtual control link over a tandem digital communications network (e.g. using a T1 carrier) between a supervisory control unit and a selected channel unit, thereby enabling the supervisory control unit to perform prescribed network functionality with respect to the selected channel unit, including provisioning, status monitoring and obtaining inventory information.

BACKGROUND OF THE INVENTION

Although the proliferation of digital signal processing equipment has met with widespread acceptance in a variety of industries, telephone companies have been slow to convert to or integrate digital signalling subsystems and communication schemes into their well established copper wire networks. One of the principal reasons for such reticence is the fact that a significant part, if not all, of an established telephone network employs analog signalling equipment. Consequently, to be accepted by the telephone company, any digital product must not only be a cost effective replacement for existing circuitry, but it must be signal-compatible with any remaining analog units of the network to which it may be interfaced.

Advantageously, the assignee of the present application currently offers to the industry digital signalling/interface units that enable digital services to be integrated into a variety of office environments, and allow digital signalling capability to be extended over a tandem communication link all the way to the customer site, without totally preempting the conventional use of analog signalling for maintenance and testing. Specifically, copending U.S. patent application Ser. No. 686,415, filed Apr. 16, 1991, entitled "Analog Service Channel Port for Digital Interface," by R. E. Bowlin et al, and co-pending U.S. patent application Ser. No. 752,777, filed Aug. 30, 1991, entitled "Digital Tandem Channel Unit Interface for Telecommunications Network," by C. L. Hall, each of which is assigned to the assignee of the present application and the disclosure of each of which is herein incorporated, describe respective types of digital data port or channel units that allow the replacement of conventional analog equipment with digital devices that are used for signalling, voice and data communications, while still retaining the ability to be interfaced with analog (tone) signalling equipment for carrying out maintenance and test procedures.

A requirement of this and any equipment installed in the communication network link is that it be maintained in good working order and, when necessary, be capable of being provisioned to meet changing user demands. Typically, status/performance evaluation and provisioning functions have been accomplished manually by a craftsperson on-site at the channel bank in which the equipment of interest is installed. In an effort to remedy the problem of rapidly escalating labor costs that now face the industry, a number of equipment suppliers have proposed replacing existing channel bank equipment with intelligent channel systems (smart channel banks combined with smart channel units).

One example of such a system is described in the U.S. Pat. No. 4,849,972 to Hackett et al entitled "Digital Data Communications Terminal and Modules Therefor." In accordance with this patented system, D4 channel bank equipment may be locally and remotely provisioned by way of an attendant microcontroller that is included as part of the common equipment. Each channel unit includes its own local microprocessor and associated NVRAM for storing provisioning data. All provisioning is effected by way of a supervisory communication path between the attendant controller and the channel bank. There is no capability of effecting remote provisioning through one or more tandem or cascade-connected channel units, through which multiple offices are interconnected with one another. In addition, the system of Hackett et al provides no mechanism for provisioning channel bank equipment from a test access location between two end offices, such as a test access location provided at a cross-connected interface within a site intermediate the end offices of the network. Consequently, as one would expect, a replacement solution of the type described in the Hackett et al patent has met with considerable resistance by the telephone companies due to the significant increase in per channel equipment cost, which is generally attributed to the need for a dedicated on site system controller (computer), enhanced channel bank common equipment, and the incorporation of resident intelligence into the channel units.

SUMMARY OF THE INVENTION

In accordance with the present invention, rather than effect a wholesale replacement of existing equipment, including the installation of a separate system controller within the channel bank, advantage is taken of the digital communication capabilities of the channel units described in the above referenced patent applications. Specifically, the invention involves equipping such channel units (through a modification of their communication-control software) with the ability to be remotely interrogated and provisioned through a virtual control link that is established over a tandem communication link through which channel units are connected in cascade between a test system controller at an interrogation site and the selected channel unit, using a modified set of inband digital code sequences that are customarily employed for effecting a latching loopback condition.

In particular, the present invention provides a technique for remotely interrogating a selected channel unit resident in any office along a tandem network communication link, by initially transmitting onto the communication link what is hereinafter termed a 'control link establishment code sequence' comprised of one or more sets of predefined digital code bytes. This format of the control link establishment sequence is such that as it is forwarded down the link, any tandem channel unit or units that are connected in cascade intermediate the test system controller and the destination channel unit will transition to a transparent state. This communication transparency of such intermediate units allows a control link establishment code set within the overall control link establishment sequence, which will enable the destination channel unit to receive and respond to command messages from the test system controller, to propagate down the link to the destination channel unit, so that only the destination channel unit will be able to transition to an interrogation, response mode.

When the destination channel unit has acknowledged receipt of the control link establishment code set, indicating that a virtual point-to-point, command-response control link has been established between the test system controller and the destination channel unit, the destination channel unit transitions to a command-response mode. During the command-response mode, tandem channel units, which are intermediate the selected channel unit and the interrogating test system controller, continue to assume a transparent state, so that command and response messages propagate unmodified through such intermediate tandem channel units. A command message may contain information for defining the operational configuration of the selected channel unit. It may be used to read the operational configuration or status of the selected channel unit, or it may contain supervisory control information for directing the selected channel unit to conform with a prescribed operational condition.

As mentioned above, the control link establishment sequence is comprised of one or more sets of digital code bytes customarily used to define a latching loopback condition of a channel unit. It also includes a prescribed code byte other than those customarily employed for defining a latching loopback condition of a channel unit. Digital code bytes customarily employed for defining a latching loopback condition include a transition in progress (TIP) code, a loopback enable (LBE) code, a loopback select (LSC) code, a far end voice (FEV) code and an all one's code. The present invention does not employ a loopback select code, which is device type specific, and further, it modifies the above code set with a test alert (TA) code, hereinafter referred to as an alert device (ADC) code, which is neither device type specific, nor does it correspond to any of the codes that have been reserved as yet unassigned codes in the telecommunications industry, so that its use will not conflict with any future assignments of control codes.

More particularly, the digital code sequence that is used to enable a channel unit to complete a (virtual) communication path or control link with the system controller comprises a 'control link establishment' code sequence or set: TIP - ADC - LBE - FEV. In accordance with the invention, the communication control mechanism of each channel unit that is intended to have the capability of being remotely interrogated and provisioned is configured such that, whenever it sees this 'link establishment' code sequence, it transitions to the command-response mode, so that an 'active session' of exchanging messages between the test system controller and the selected channel unit may be conducted. The selected channel unit also transmits a multiplexer (MUX) out-of-sync (MOS) code downstream to prevent any other channel units from monitoring command-response messages between the test system controller and the selected channel unit, so that a downstream user will know that the link is out of service.

The code sequence that is used to cause a channel unit to transition to the transparent mode comprises a 'go transparent' code sequence or set: TIP - ADC - LBE - ALL '1'S - ADC. When a channel unit initially sees a 'go transparent' code sequence, it transitions to the transparent mode. It also modifies selected ones of the 'go transparent' code sequence and then passes the modified sequence down the link. Specifically, the channel unit passes the initial TIP and ADC codes as is, it maps the LBE code into a device type code and converts the ALL '1'S code into a TIP code. This converted TIP code serves as the initial code of the next code set (either another 'go transparent' code set or the 'control link establishment' code set. The ALL '1'S code clears existing channel formats of that channel unit. Upon receipt of the second ADC byte, the intermediate channel unit enters a transparent state in which all code modification or mapping is turned off, so that any subsequently received code bytes (which may be either part of additional 'go transparent' code sets or a 'link establishment' code sequence) propagate through the intermediate channel unit unmodified.

Once the selected channel unit has transitioned to an active session, command-response mode, it proceeds to exchange messages with the test system controller until the link is terminated from the interrogation site. To exit from or terminate an active session, the test system controller may transmit a TIP code byte. In addition, if a prescribed period of time expires without the channel unit receiving a command message, the control link is terminated. The prescribed period of time is sufficient to allow a craftsperson to manually interrogate, provision the channel unit.

BRIEF DESCRIPTION OF THE DRAWINGS

FIG. 7 illustrates the structure of a DS0 byte in which the communication protocol of the present invention is embedded.

DETAILED DESCRIPTION

Figure 1:
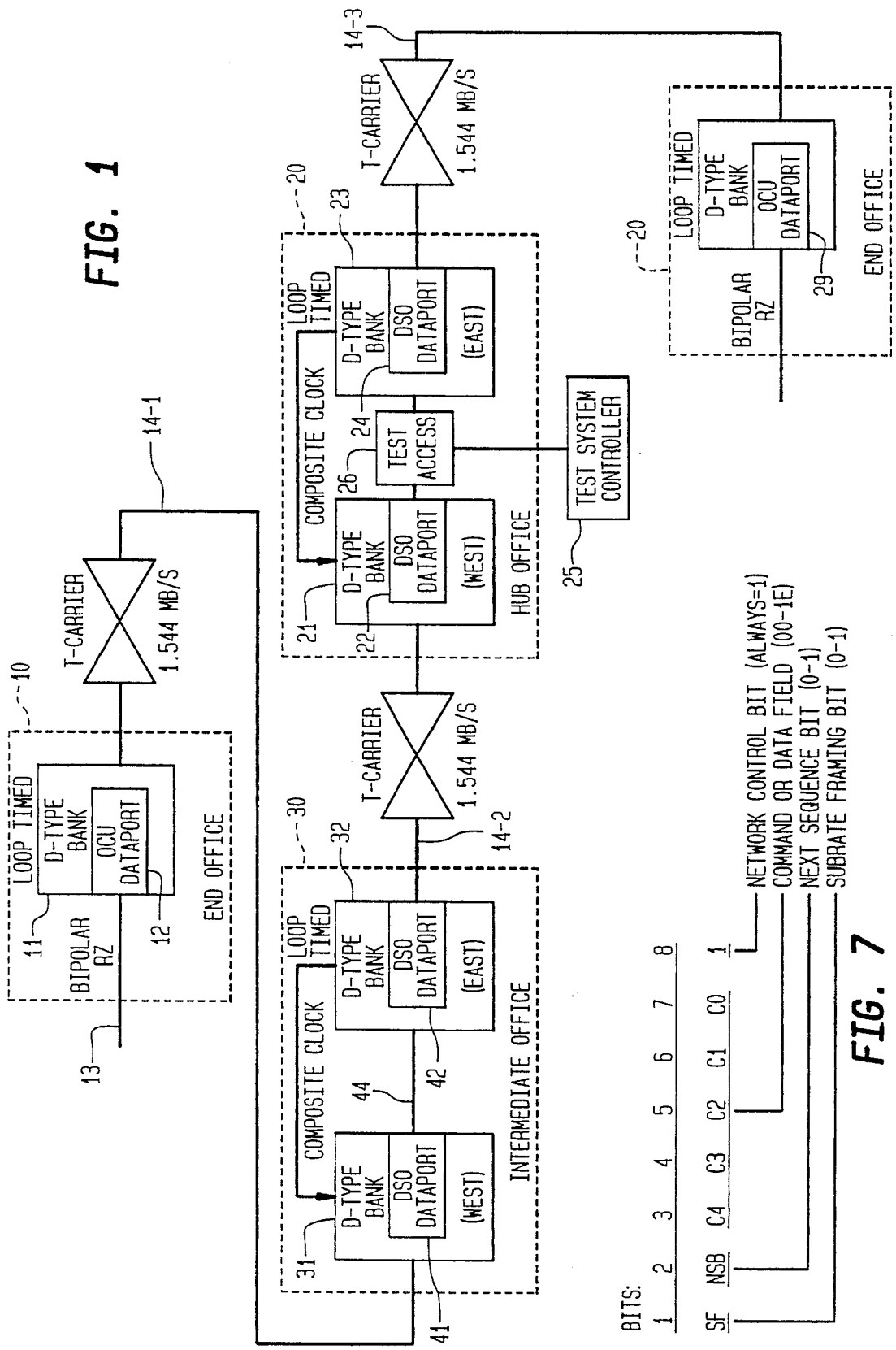
FIG. 1 diagrammatically illustrates a simplified example of a representative digital carrier telephone network in which the remote provisioning mechanism of the present invention may be employed.

Before describing in detail the remote provisioning mechanism in accordance with the present invention, it should be observed that the present invention resides primarily in what is effectively a prescribed communication protocol and an augmentation of the control software employed by the micro-controller within the digital signalling/interface units detailed in the assignee's previously referenced co-pending patent applications, so as to permit a remote test system controller to selectively establish a control link with and exchange command response messages with such channel units on a one at a time basis. The details of the circuitry of the channel units are otherwise essentially unaffected. Consequently, the configuration of such channel units and the manner in which they are interfaced with other communication equipment of the telephone network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

FIG. 1 diagrammatically illustrates a simplified example of a representative digital carrier telephone network in which the remote provisioning mechanism of the present invention is intended to be used. The network itself is shown as comprising a first end office 10, located at the 'west' end of the network as viewed in the Figure, having a D4-type channel bank 11 containing an OCU data port or channel unit 12 of the type described in the above referenced Bowlin et al application. OCU data port 12 interfaces bipolar signals carried by a four-wire link 13, which is coupled to analog, digital communication equipment served by the network, with an all digital communication link 14, such as a T1 (1.544 Mb/s) link. T1 link 14 contains a first portion 14-1 through which frames of DS1 digital data are carried between 'west' end office 10 and an intermediate station 30. Intermediate station 30, in turn, is coupled via a T1 carrier link portion 14-2 to a hub office 20, located at the 'east' end of link 14-2. Intermediate office 30 and hub office 20 have D4-type channel banks containing DS0 data ports of the type described in the above referenced Hall application. Intermediate office 30 has a pair of cross-connected channel banks 31–32 containing DS0 dataports 41, 42, while hub office 20 contains a pair of cross-connected channel banks 21–23 containing DS0 data ports 22–24. DS0 data port 24 of channel bank 23 interfaces with link 14-3 for the DS1 signal format carried by the T1 carrier link portion 14-3. T1 carrier link portion 14-3 is shown as being connected to an end office 28, having a channel bank 27, which contains an OCU data port 29 for servicing analog, digital communication equipment at an 'eastwardmost' end of the network.

As described above and as shown in FIG. 1, interposed in tandem within T1 digital link 14, between west end office 10 and hub office 20, are one or more intermediate offices, a single intermediate office being shown at 30, having 'west' and 'east' channel banks 31 and 32 coupled to respective portions of T1 digital link 14. An intra-office cross connect (typically on the order of 1500 feet of communication cable) between channel banks 31 and 32 of intermediate central office 30 is formed of a four-wire transmit/receive pair 44, opposite ends of which are ported to respective 'west' and 'east' tandem DS0 dataports or channel units 41 and 42 in the manner described in the Hall application. As described therein, each of digital tandem-connected DS0 dataports 41, 42 is ported to interface frames of DS1 data on T1 link 14 and corresponding frames of DS0 data of the four-wire intra-office digital T/R link 44 through which the digital tandem dataport (channel unit) pair 41—42 is linked across the office.

As is described in the above referenced applications, each digital channel unit, whether it be an OCU dataport channel unit, such as unit 12 resident in 'west' end office 10, or a DS0 dataport channel unit, such as those resident in hub office 20 and intermediate office 30, includes respective transmit/receive buffers associated with the respective (bipolar/DS1/DS0) ports of that unit. These buffers are controlled by a resident micro-controller for interfacing DS1 formatted data traffic from the line (T1 link) side of the unit, retiming the traffic as a DS0 data stream (in the case of a DS0 data port) or a bipolar data stream (in the case of an OCU data port) for transmission from the channel unit, and reconverting bipolar signals (in the case of an OCU data port) or DS0 data frames (in the case of a DS0 data port) into DS1 data frames for transmission over T1 link 14. In addition, controllably enabled loopback paths are provided between the DS1 and bipolar/DS0 ports of the channel unit, so as to permit a channel loopback either at the line side of the unit or at the drop side of the unit.

For purposes of facilitating an understanding of the present invention, the remote provisioning mechanism will be detailed with o reference to a DS0 data port channel unit, such as DS0 dataport channel unit 22 within hub office 20 or tandem-connected DS0 dataports 41, 42 within intermediate office 30, the details of which are set forth in the above referenced Hall application. It should be understood, of course, that the manner in which the link establishment and command/response communication protocol in accordance with the present invention is embodied in the microcontroller of a DS0 dataport channel unit is equally applicable to the OCU dataport channel unit described in the Bowlin application. Indeed, as described in the Hall application, the general architectures of a DS0 data port and an OCU data port are very similar, each containing a communications control processor or microcontroller, which is interfaced with each of the signalling portions of the channel unit and controls the formatting and transmissions of successive frames of data between the digital T1 link and an associated DS0 or bipolar signalling port. It is also to be understood that the use of the present invention is not limited to only these particularly identified dataport types. They are merely given as examples of a digital telecommunication environment in which the present invention may be employed. What is required of the network equipment, in which the present invention is to be incorporated, is that it incorporate a respective channel unit containing a supervisory communication control mechanism, which is configurable to respond to the signalling sequences used by the remote provisioning mechanism.

Figure 2:
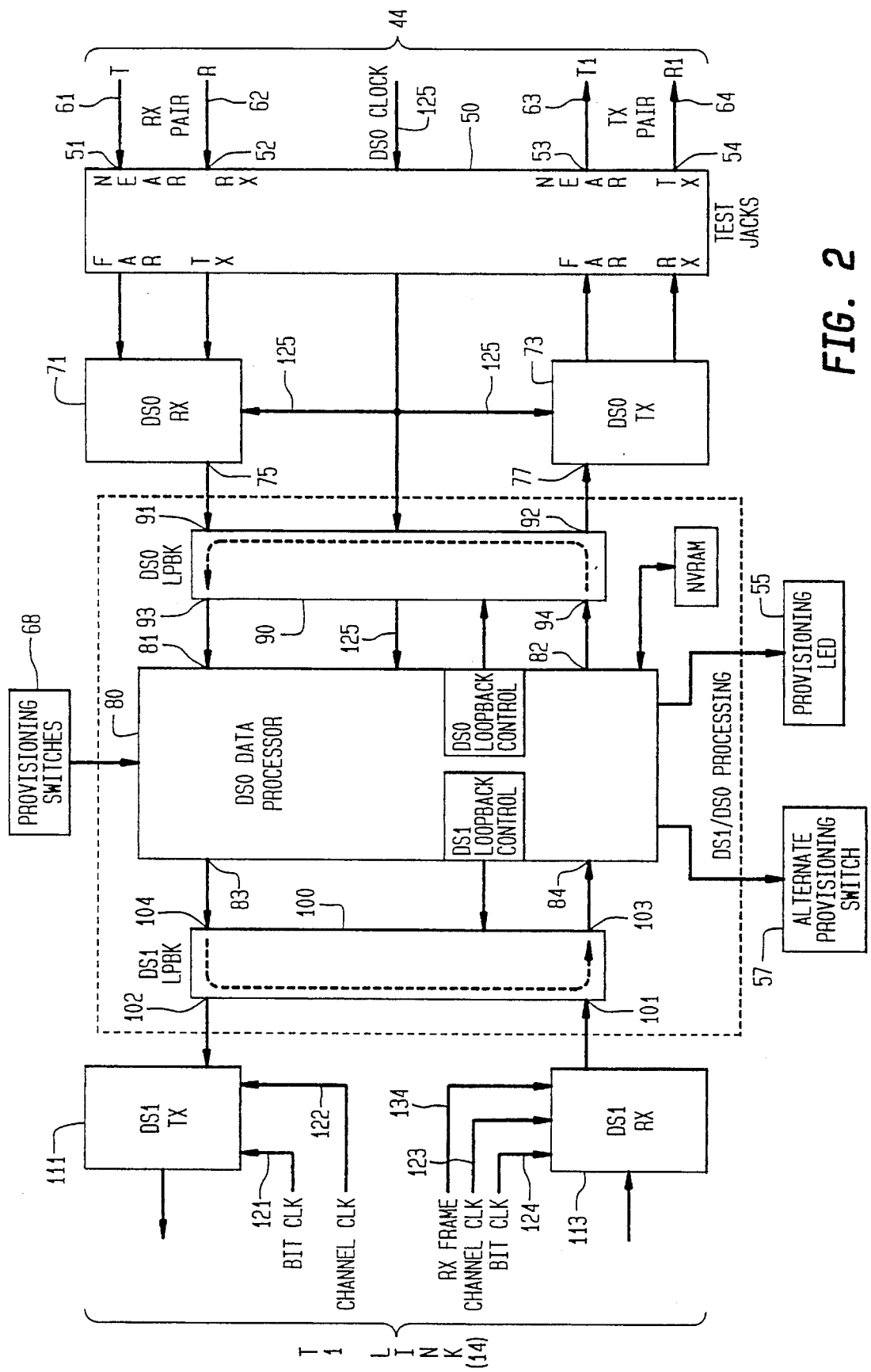
FIG. 2 diagrammatically illustrates the configuration of a DS0 data port channel unit.

FIG. 2 diagrammatically illustrates the configuration of a DS0 data port channel unit detailed in the co-pending Hall application, through which a D4-type channel bank, such as those located in intermediate central office 30, may be digitally coupled with DS1 digital carrier (T1) link 14 and accessed by a remotely located channel unit interrogation system, hereinafter termed a test system controller (TSC). The test system controller is shown at 25 in FIG. 1 as being coupled via a test access connection 26 to the cross-connection between respective dataports 22 and 24 of channel banks 21 and 23 of hub office 20, so that the access location of test system controller (TSC) 25 is between end offices 10 and 28, each containing an OCU dataport. In lieu of cross-connected DS0 dataports within respective D4 channel banks, hub office 20 may contain a digital cross-connect system to which T1 carrier links 14-2 and 14-3 are directly ported, with TSC 25 being coupled to the digital cross-connect system for gaining access to the T1 communication channel between the OCU dataports within the west and east end offices 10 and 28, respectively. Also, hub office 20 may be connected via T1 carrier links to end offices 10 and 28 without one or more intermediate offices therebetween. In this instance, hub office 20 may contain cross-connected DS0 dataports of respective channel banks to which the T1 links are ported, or its may simply contain a digital cross-connect. In the former case, the TSC 25 is connected via a test access (as at 26 in FIG. 1) between the dataports, while in the latter case the TSC is connected directly to the digital cross-connect. Also there may be one or more intermediate offices located between hub office 20 and the east end office 28. Again, it is to be realized that the network architecture of FIG. 1 is an example and not to be considered limitative of the use of the present invention.

As pointed out previously, since the invention resides essentially in an enhancement to the control software employed by the data port's micro-controller, the configuration and operation of those components of the DS0 data port that are conventional will be described in only a general sense. Where more detail is desired attention may be directed to the equipment itself and to information supplied by the manufacturer.

As shown in FIG. 2, a DS0 data port channel unit comprises a four-wire test access interface 50, comprised of tip (T) and ring (R) input and output port pairs 51, 52 and 53, 54 to which respective tip and ring (T,R) lines 61, 62 and tip and ring (T1,R1) lines 63, 64 of four wire cross connect link 44 are coupled. Test access to the transmitted and received signals of interface 50 is effected by way of bantam jacks located on the channel unit faceplate using a DDS portable test unit (e.g. KS-20908/20909 or functional equivalent). The channel unit faceplate also includes a conventional set of manual provisioning switches 68 the settings of which are selectable to predefined positions and read by the channel unit's microcontroller 80 for setting the operation or provisioning the channel unit. As an adjunct to this switch bank, in accordance with the present invention, the channel unit faceplate also includes a remote provisioning indicator 55 which is coupled as an auxiliary I/O (LED) element with the channel unit's microcontroller 80 for providing a visual indication that the channel unit is currently subjected to a remote provisioning operation. Associated with remote provisioning indicator 55 is an alternate provisioning (momentary) switch 57 which is also coupled as an auxiliary I/O element used by the craftsperson to override a previously established remote provisioning of the channel unit and manually configure the channel unit through front panel switches 68. The I/O control software within the microcontroller is such that remote provisioning indicator 55 is illuminated continuously when the channel unit is operating in response to remote provisioning, and is off when operating based upon manual provisioning by way of switches 68.

Interface 50 couples respective tip and ring inputs 51, 52 through a line coupling transformer (not shown) to a bipolar receiver within a DS0 receive buffer unit 71. DS0 receive buffer unit 71 comprises a bipolar receiver, which decodes an incoming 64 Kb/s bipolar non-return to zero (NRZ) DS0 signal on the intra office cross connect 44 and buffers the converted binary data frames for processing (retiming and retransmission) by an attendant micro-controller 80.

For this purpose, the bipolar receiver may comprise an equalizer the output of which is coupled to a bit slice circuit which compares the equalized signal to threshold levels that are set at one-half the magnitude of the positive and negative peaks of the bipolar data stream and outputs a dual polarity digital representation of the received data on complementary polarity links. The data is then sampled in a synchronous sampling circuit and coupled over respective positive and negative polarity data links to a non return-to-zero (NRZ) decoder, which outputs a binary serial data stream in accordance with the contents of the NRZ data. The 64 KHz digital data is then coupled to a code converter which, under the control of a port micro-controller 80, provides a recovered 64 Kb/s (DS0) data stream to be retimed at the DS1 data port for transmission over the T1 link as an outbound DS1 (1.544 Mb/s PCM) data stream.

For outbound, DS0 data, T/R interface 50 couples respective tip and ring outputs 53, 54 through a line coupling transformer (not shown) from a bipolar transmitter within a DS0 transmit buffer unit 73. Under the control of micro-controller 80, unit 73 buffers outbound frames of binary data DS0, which are controllably supplied to a bipolar transmitter for encoding and transmission as an outbound 64 Kb/s bipolar non-return to zero (NRZ) DS0 signal.

Receive buffer unit 71 has its output port 75 coupled to a first port 91 of a DS0 loopback interface 90, while transmit buffer unit 73 has its input port 77 coupled to a second port 92 of DS0 loopback interface 90. DS0 Loopback interface 90 is preferably comprised of a software-controlled loopback path, the throughput state of which is defined by micro-controller 80. In its normal non-loopback condition, interface 90 couples DS0 receive port 91 to port 93 and DS0 transmit port 94 to port 92. For a DS0 or drop side loopback, the receive and transmit communication paths through ports 91-93 and 94-92, respectively, are interrupted and a loopback path is effected through interface 90 from transmit port 94 to receive port 93.

Receive output port 93 of DS0 loopback interface 90 is coupled to a transmit input port 104 of a DS1 loopback interface 100. Like DS0 loopback interface 90, DS1 loopback interface 100 is preferably comprised of a software-controlled loopback path, the throughput state of which is defined by micro-controller 80. In its normal non-loopback condition, DS1 loopback interface 100 couples a DS1 receive input port 101 to DS1 receive output port 103 and DS1 transmit output port 102 to DS1 transmit input port 104. For a DS1 or line side loopback, the receive and transmit communication paths through ports 101-103 and 104-102, respectively, are interrupted and a loopback path is effected through interface 100 from transmit port 104 to receive port 103.

DS1 transmit port 102 of loopback interface 100 is coupled to a DS1 transmit buffer unit 111, while its DS1 receive port 101 is coupled to a DS1 receive buffer unit 113. Transmit buffer unit 111 comprises a set of cascaded holding registers into which a decoded DS0 data stream is loaded by DS0 bit and byte clocks in the course of transmission out over the T1 link 14, in order to prevent byte slips resulting from phase shifts between the 64 KHz DS0 and 1.544 MHz DS1 data clocks.

Similarly, DS1 receive buffer unit 113 comprises a set of cascaded holding registers into which an incoming PCM (T1) data stream is downloaded by DS1 bit and byte clocks when the channel unit is enabled to receive T1 data. The receive holding registers are unloaded synchronously by the DS0 bit and byte clocks to form the outbound DS0 data stream for transmission (e.g. to a cross connected tandem channel unit within intermediate office 30).

More particularly, the contents of DS1 receive buffer unit 113 are synchronously unloaded to a code converter, which is driven by a variable rate clock generator under the control of micro-controller 90. The code converter is also employed to controllably insert prescribed control codes, such as a 'loss of signal' code byte to be substituted for DS0 data when there is a loss of signal or a unit coupled to the channel is asserted quiet (turned off). The 64 Kb/s data stream is coupled to an NRZ encoder within transmit buffer 73 which encodes the data stream into a bipolar, non return-to-zero format. The bipolar data is then output to bipolar signal line drivers. These line drivers drive the secondary winding of the coupling transformer, which is coupled to tip and ring (T1, R1) output ports 53 and 54, to which the T1 and R1 lines 63, 64 of an associated signalling link interfaced to the channel bank are coupled.

As the operation of the DS0 data port of FIG. 2 is detailed in the above referenced Hall application, it will not be repeated here. Instead, the following description will set forth the enhancement to the control mechanism resident within micro-controller 80 and the remote provisioning communication protocol it employs that enables the channel unit to be interrogated by and respond to command messages issued by the test system controller.

Figures 3, 6:
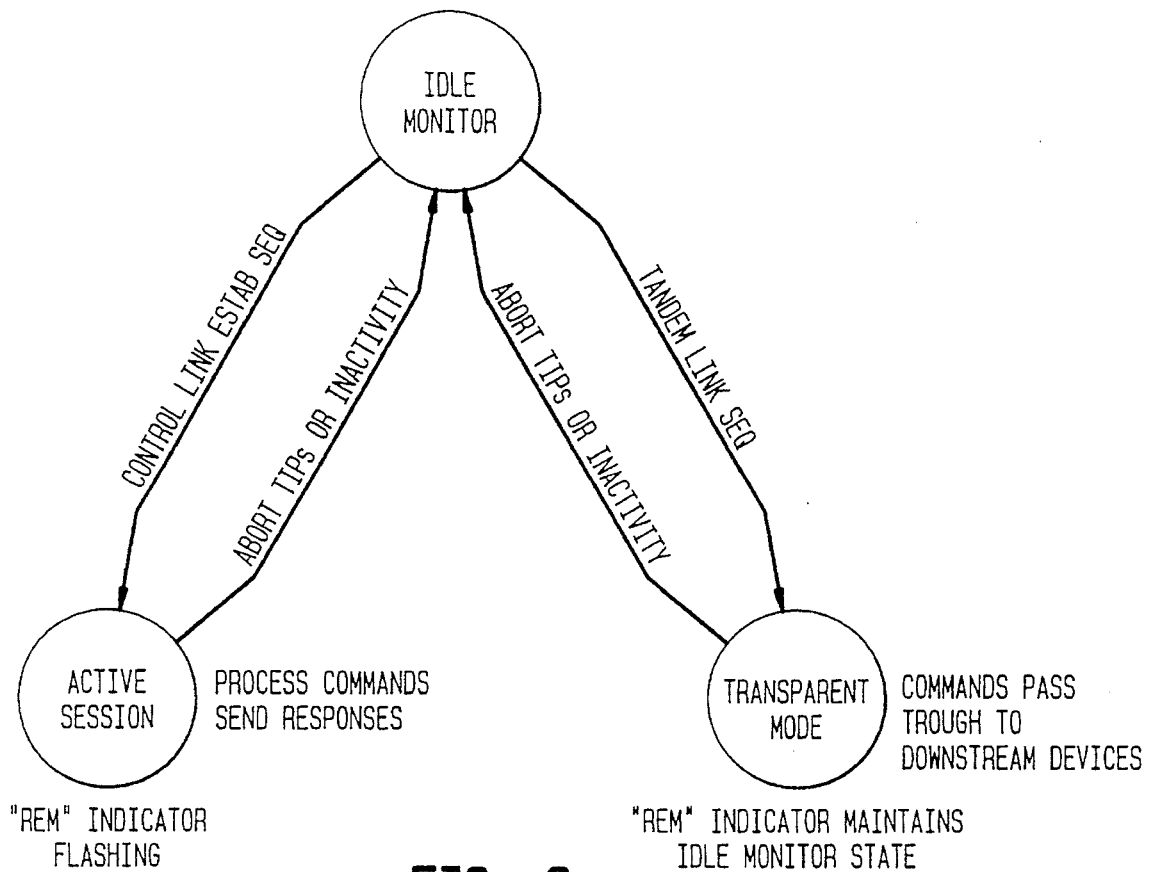
FIG. 3 is a general state diagram of the remote provisioning mechanism in accordance with the present invention.
FIG. 6 shows the format of a command message sourced from a test system controller.

As described briefly above and as diagrammatically illustrated in the state diagram of FIG. 3, the remote provisioning mechanism in accordance with the present invention comprises two sequential events or phases. During the first phase a 'control link establishment' sequence, comprised of one or more sets of predefined code bytes, is transmitted from the interrogating test system controller toward the selected or destination channel unit. When properly received by the destination channel unit, the control link establishment code set within the control link establishment sequence will cause the selected channel unit to transition from its IDLE MODE 301 to an ACTIVE SESSION MODE 303. Should there be any intervening channel units located between the test system controller and the selected channel unit, a corresponding 'go transparent' code set within the link establishment sequence will cause such intervening channel unit to transition from its IDLE MODE 301 to a TRANSPARENT MODE 305. In this transparent mode, the channel unit is effectively transparent to incoming communications either from an upstream source or a downstream source, so that an uninterrupted virtual control link is established from, the test system controller through one or more transparent intervening channel units to the selected channel unit. During an ensuing second 'active session' phase, command messages and response messages are exchanged between the test system controller and the selected channel unit (ACTIVE SESSION MODE 303).

CONTROL LINK ESTABLISHMENT PHASE

Figure 4:
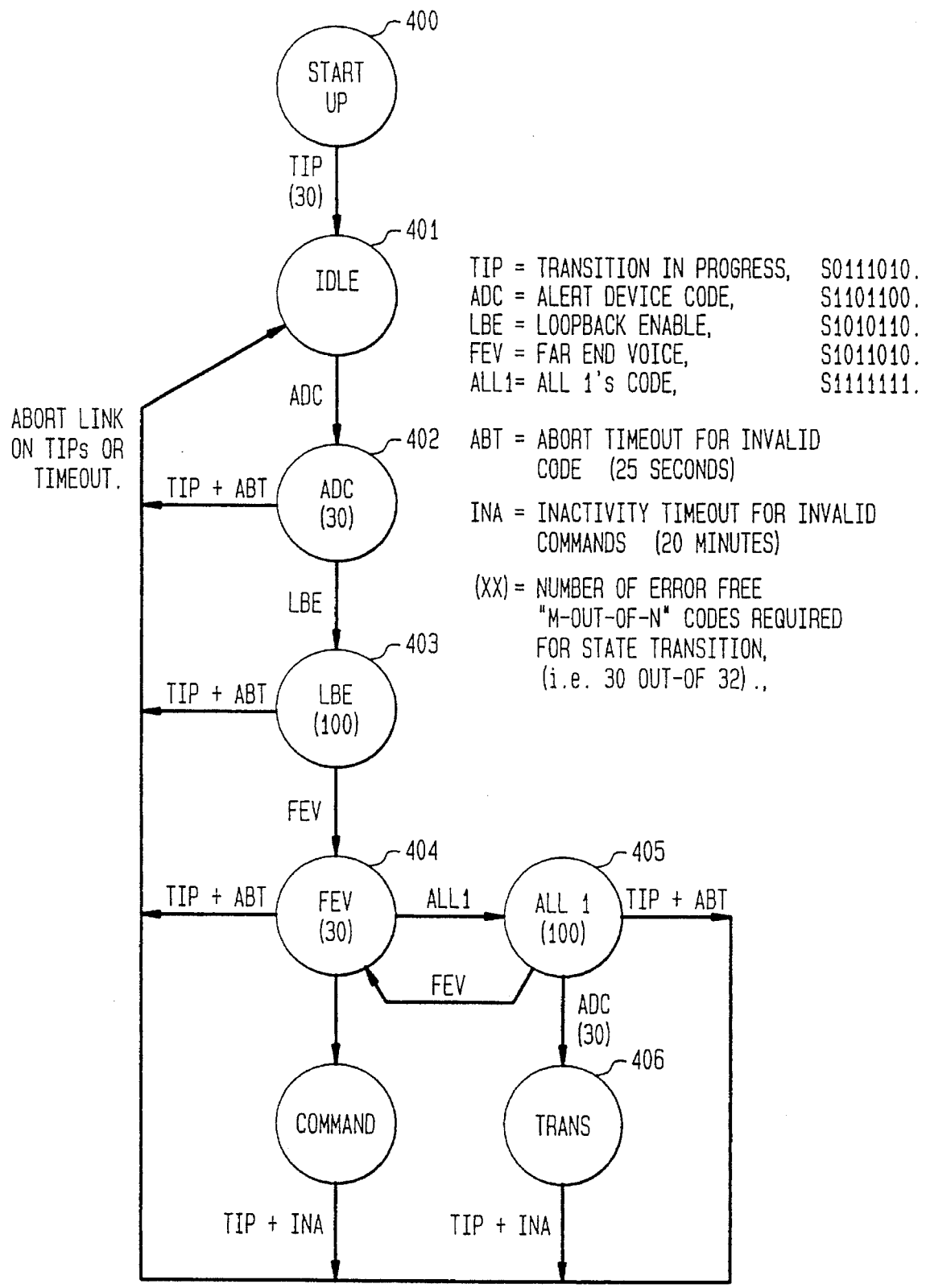
FIG. 4 is a state diagram of the operation of a channel unit in the course of the execution of the remote provisioning mechanism of the present invention.

The control link establishment sequence that is transmitted from the TSC during the first phase comprises a modified sequence of inband digital code bytes that are customarily employed for effecting a latching loopback condition. The individual code bytes that are used to form a link establishment sequence are shown in FIG. 4 as comprising a transition in progress (TIP) byte=S0111010, an alert device code (ADC) byte=S1101100, a loopback enable (LBE) code byte=S1010110, a far end voice (FEV) code byte=S1011010, and an all one's (ALL '1'S) code byte=S1111111. Within each respective code byte, S is a network framing bit (if applicable) or a don't care bit, The use of the alert device code (ADC) distinguishes the control link establishment sequence from that customarily employed for establishing a latching loopback condition, which employs no such ADC code.

As will be explained below, the control link establishment sequence transmitted from the test system controller is comprised of one or more sets of the above codes, one of which contains a 'control link establishment' set: TIP - ADC - LBE - FEV. It is the location of this particular set of code bytes within the overall control link establishment sequence that determines which channel unit along the link is the destination or selected channel unit. Ahead of or prior to the occurrence of the control link establishment code set within the link establishment sequence, one or more 'go transparent' code sets are transmitted down the link, for the purpose of placing any intermediate, channel units in a transparent mode, so as to allow the control link establishment code set to propagate to the destination channel unit. A 'go transparent' code set consists of the code sequence: TIP - ADC - LBE - ALL '1'S - ADO.

Namely, the link establishment sequence that is transmitted from the test system controller is comprised of one or more sets of digital code bytes each of which serves to control the state of a respective one of channel units that are coupled in tandem along the communications link from the test system controller to the destination channel unit. For each intermediate channel unit located between the test system controller and the selected channel unit, the link establishment sequence is formatted to include a respective 'go transparent' code set. Thus, if there are two intermediate channel units between the test system controller and the destination channel unit, the link establishment sequence will contain two 'go transparent' code sets, that are successively detected by the two intermediate channel units, followed by a 'link establishment' code set, to which only the destination channel unit responds.

Figure 5:
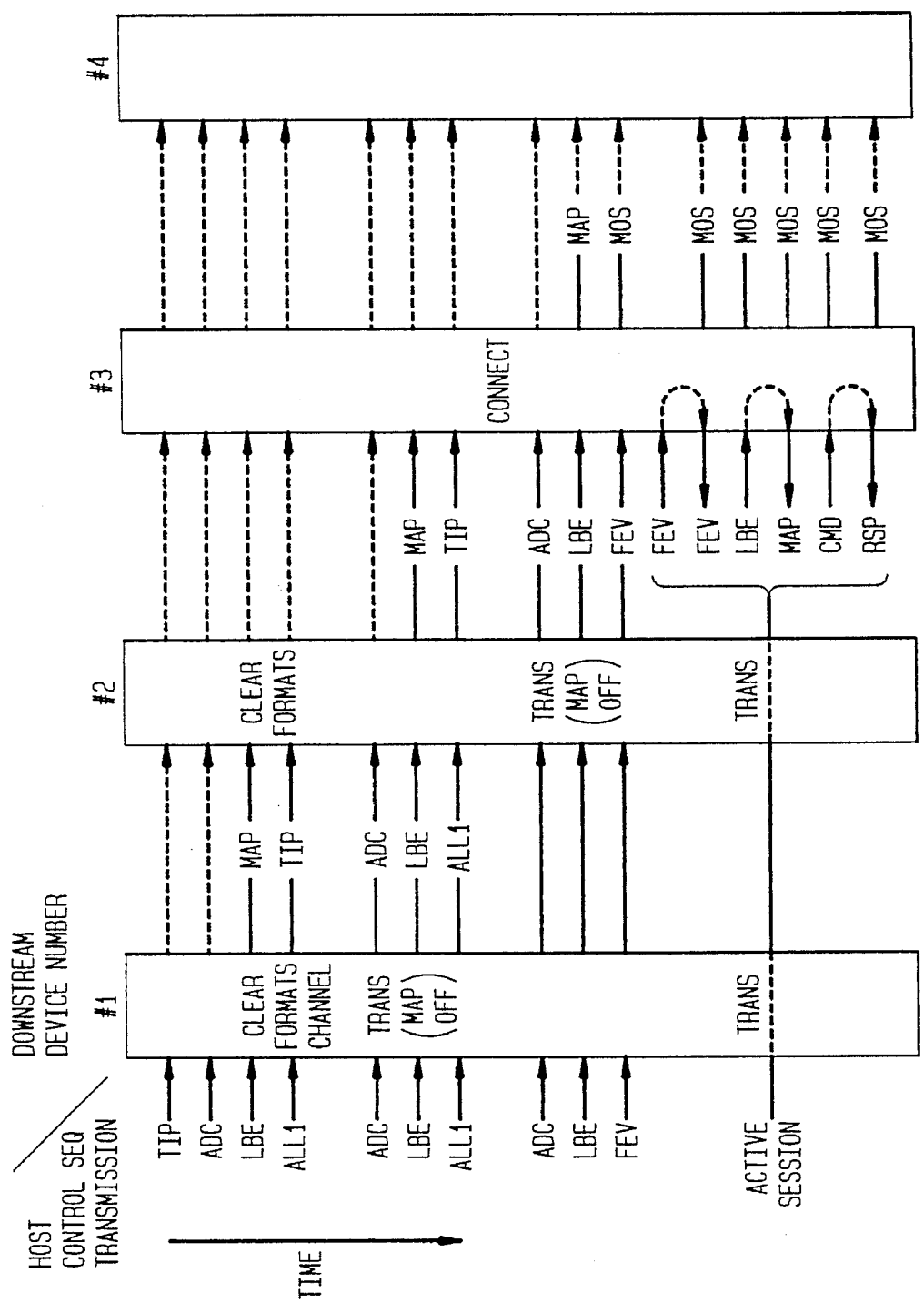
FIG. 5 diagrammatically shows the communication link flow of a link establishment control sequence and command-response messages of the remote provisioning mechanism of the present invention.

FIGS. 4 and 5 respectively show a state diagram of a channel unit and, the signal flow path for establishing a virtual communication path from the test system controller through successive intermediate channel units along the link to a selected channel unit. For purposes of the present description, for the network diagram of FIG. 1, let it be assumed that test system controller 25 desires to interrogate DS0 dataport 41 within intermediate office 30. Interposed between dataport 41 and the test system controller 25 are tandem channel units 42 and 22, so that relative to the location of test, system controller 25 along the digital communication link, DS0 dataport 41 is the third channel unit in a sequence starting from the TSC coupled to hub office 20. Channel unit 22 is the first channel unit and channel unit 42 is the second channel unit. Likewise, channel unit 12, which is downstream from DS0 dataport 41, is channel unit number four relative to test system controller 25.

Because there are two intermediate channel units between test system controller 25 and destination channel unit (DS0 dataport) 41, the control link establishment sequence that must appear on the link will contain two 'go transparent' code sets (TIP - ADC - LBE - ALL '1'S - ADC), intended for channel units 22 and 42, followed by the 'link establishment' code set (TIP - ADC - LBE - FEV) intended for channel unit (DS0 dataport) 41. To prevent erroneous detection of a code byte, each code byte is transmitted repetitively for a prescribed number of bytes (e.g. 40 consecutive bytes) and verified by the receiving unit performing an M-out-of-N comparison. Thus, when initiating the control link establishment phase, the test system controller transmits a consecutive number (40) of TIP bytes of the first 'go transparent' set intended for channel unit 22.

As shown in the state diagram of FIG. 4, when a channel unit is placed in service (STATE 400), it monitors the link for the transmission of a TIP code byte sequence from the test system controller. When it has detected a valid TIP code byte sequence (successfully detected M-out-of-N, e.g. 31 out of 32 TIP repeats from the TSC), the channel unit transitions to the IDLE state 401 and begins looking for the next code in the link establishment sequence, specifically a sequence of consecutive ADC bytes. Thus, in the present example, once test system controller 25 has initiated the transmission of a control link establishment sequence by transmitting the TIP code byte, the first channel unit along the link which receives the TIP code (namely, channel unit 22) does not yet know whether it will be placed in a 'go transparent' mode or in a 'link establishment' mode.

In accordance with the control link establishment protocol employed by each channel unit, a TIP code is passed on down the link as is, and the channel unit transitions to the TIP state wherein it begins looking for a valid ADC code byte sequence. Thus, as shown in FIG. 5, the channel unit 22 also forwards the TIP code byte downstream to the next channel unit (here DS0 dataport 42 Within the D4-channel bank of intermediate station 30) and transitions to IDLE state 401. If channel unit 22 fails to verify reception of the requisite number of error free TIP code bytes, it maintains its state 400.

Upon completion of the transmission of the requisite number of consecutive TIP code bytes, test system controller 25 transmits the next code byte in the first 'go transparent' set of the control link establishment sequence—the ADC code byte sequence. As in the case of the transition in progress (TIP) code byte, upon detecting a valid ADC code byte sequence, channel unit 22 transitions from IDLE state 401 to ADC state 402 and begins looking for an LBE code byte. In accordance with the control link establishment protocol, channel unit 22 also forwards the ADC code byte downstream to the next channel unit, here DS0 dataport 42.

Following the transmission of the ADC code byte, test system controller 25 proceeds to transmit an LBE code byte sequence. When channel unit 22 detects a valid LBE byte sequence (again using an M-out-of-N comparison to validate the byte), it transitions to LBE state 403 and maps the LBE code byte into one of a pair of map codes associated with the type of channel unit. For an OCU data port, the map code may be a map code such as MAP1=S1101101; for a DS0 data port, the map code may be a map code such as MAP0=S0010011 when the control link is established from the drop side of the channel unit, and MAP1=S1101101 when the control link is established from the line side of the link. In the present example, since the test system controller 25 is located at the drop side of the link, channel unit 22 maps the LBE code into map code MAP0=S0010011. In accordance with the control link establishment protocol, this translation or mapping of the LBE code to a prespecified map code prevents downstream channel units from responding to the current 'go transparent' code set for the mapping channel unit 22.

In LBE state 403 channel unit 22 begins looking for the next byte to be transmitted from test system controller 25. Since channel unit 22 is an intermediate channel unit, for the first 'go transparent' code set transmitted by the test system controller, the next code byte will be an ALL '1'S code byte, as described above. The transmission of an ALL '1'S code byte from the test system controller serves to clear all preexisting channel formats in the intervening channel unit 22.

In accordance with the control link establishment protocol of the present invention, when a valid ALL '1'S code sequence has been received by a channel unit, the channel unit responds by converting the ALL '1'S code into a TIP code and forwards the new TIP code down the link. This converted TIP code serves as the first code byte of the next code set within the control link establishment sequence, either another 'go transparent' code set, where the next channel unit is another intervening channel unit, or as the first code byte of the 'control link establishment' code set of the destination channel unit. In the present example, since the next downstream channel unit (DS0 dataport 42) is another intervening channel unit, the TIP code output by channel unit 22 is the TIP code of a corresponding 'go transparent' code set for channel unit 42.

The test system controller next transmits an ADC byte which effectively serves as the terminal code byte of the first 'go transparent' code set, as defined previously, and as the first ADC byte of the second 'go transparent' code set, intended for channel unit 42, of the control link establishment sequence. In accordance with the control link establishment control protocol of the present invention, channel unit 22 responds to this terminating ADC code byte of the first 'go transparent' code set by forwarding the ADC code byte downstream and transitioning to TRANSPARENT MODE 305 (FIG. 3). In the transparent mode, all code modification or mapping that may be carried out by the channel unit (here channel unit 22) is turned off, so that any subsequently received code bytes (which may by either part of additional 'go transparent' code sets or a 'link establishment' code sequence) propagate through the intermediate channel unit 22 unmodified. The ADC byte is propagated downstream to channel unit 42 as the second byte in the 'go transparent' set for channel unit 42.

Following the transmission of the ADC code byte to begin the second 'go transparent' code set of the link establishment sequence, (which clears existing formats of channel 22, as described above), test system controller 25 transmits successive LBE and ALL '1'S code bytes of the second 'go transparent' code set, which are propagated through (now transparent) channel unit 22 to downstream channel unit 42, as shown in FIG. 5. When channel unit 42 detects a valid LBE byte sequence, it transitions to LBE state 403 and maps the LBE code byte into one of a pair of map codes associated with the type of channel unit, to prevent downstream units from responding to the second 'go transparent' code set for channel unit 42. In LBE state 403 channel unit 42 begins looking for the next valid byte sequence to be transmitted from the TSC, which, in the present example is the ALL '1'S code byte sequence of the second 'go transparent' code set. As in case channel unit 22 for the ALL '1'S code byte of the first 'go transparent' code set, the ALL '1'S code byte of the second 'go transparent' code byte set clears all preexisting channel formats in channel unit 42.

Channel unit 42 converts a valid sequence of ALL '1'S code bytes into a sequence of TIP code bytes (which is the first code byte of the next set of code bytes of the link establishment sequence) and forwards the new TIP code byte to the next downstream channel unit. Since, in the present example, the next downstream channel unit 41 is the destination channel unit, the next code set contains those code bytes that define a 'control link establishment' code set. The test system controller 25 next transmits a sequence of ADC code bytes, which serves as the terminating byte of the second 'go transparent' code byte set for channel unit 42, and the ADC code byte of the 'control link establishment' code byte set intended for the next (destination) channel unit 41. The terminating ADC code byte of the second 'go transparent' code byte set causes intermediate channel unit 42 to enter TRANSPARENT MODE 305, so that all code modification or mapping that may be carried out by channel unit 42 is turned off, and any subsequently received code bytes propagate through intermediate channel unit 42 unmodified. The ADC byte is propagated downstream to channel unit 41 as the second byte in the 'link establishment' code byte set for channel unit 41.

Following the transmission of a sequence of the third ADC code bytes, test system controller 25 transmits a sequence of LBE code bytes of the 'control link establishment' code byte set. When channel unit 41 detects a valid LBE byte sequence, it transitions to LBE state 403 and maps the LBE code byte into one of a pair of map codes associated with the type of channel unit. In LBE state 403 channel unit 41 begins looking for the next valid byte to be transmitted from the TSC. Since channel unit 41 is the destination channel unit, the next valid code byte sequence will be a sequence of FEV code bytes. Upon detecting a valid FEV code byte, destination channel 41 transitions to state 404. In this state the destination channel unit is ready to receive command messages from the test system controller. In accordance with the control link establishment protocol of the present invention, the destination channel unit loops the FEV code bytes back to the test system controller, which allows the controller to confirm establishment of the control link. This completes the first, 'control link establishment' phase of the communication mechanism in accordance with the present invention.

Until the control link or channel is terminated by the test system controller (transmitting a TIP code) or aborted for lack of activity (e.g. a twenty minute time-out), the destination channel Unit 41 begins looking for command messages from the test System controller during the second phase of operation of the link. Upon receipt of command messages, the channel unit transmits response messages back to the test system controller until the link is terminated. Destination channel unit 41 also transmits a multiplexer out-of-sync (MOS) code downstream to prevent any downstream units (here, channel unit 12) from monitoring command-response messages between the test system controller and the selected channel unit. As will be described in detail below, during this command-response phase, the test system controller sends commands, followed by optional parameter data, and receives response messages from the selected channel unit 41, until it terminates the control link by transmitting a TIP code or ceases transmitting command messages to the channel unit for a prescribed length of time, in response to which the channel unit returns to normal operation.

COMMAND-RESPONSE PHASE
COMMAND MESSAGE FORMAT

The format of a command message sourced from the test system controller is diagrammatically illustrated in FIG. 6 as comprising a sequence of code bytes consisting of a start of message (SOM) field 201, a command type (CT) field 203, one or more optional parameter (data) code bytes that make up a parameter field 205, and an end of message field 207. Again, as in the case of link establishment sequence code bytes, to prevent erroneous detection of a command code byte, each command code byte is transmitted repetitively for a minimum of a prescribed number of bytes (e.g. 40 consecutive bytes) and verified by the channel unit performing an M-out-of-N comparison (e.g. 31 out of 32). The test system controller continues to send each respective code after it has transmitted this minimum number until the channel unit responds with a correct next sequence bit (NSB) to be described below, or until a preset time interval has elapsed without a response (e.g. a two second timeout). If a valid response code is not returned from the channel unit to the TSC prior to the expiration of the timeout, the test system controller begins error recovery, preferably by retransmission of the command message. If repeated retransmission is unsuccessful after a predetermined number retransmissions (e.g. three attempts), the test system controller transmits a TIP code byte to terminate the control link. The channel unit acknowledges and responds to a valid command message by sending a response message back to the test system controller. If a command message contains invalid command field or parameter data, the channel unit will transmit back an error response code.

Each of the start of message code 201 and the end of message code 207 consists of an ALL '1'S (data mode idle) code. Upon receipt of this code, the channel unit resynchronizes its receiver and begins looking for the command field (CT) code 203. Following the CT code 203 is one or more parameter codes associated with the type of command contained in the message. During an interrogation command message, for example, the data within the parameter field 205 selects a specific register in the channel unit, the contents of which are read out and placed in the parameter field of the response message. During a provisioning command message, parameter field 205 contains alternating register address/data bytes for loading configuration information into the channel unit's configuration registers. For a supervisory command message, the parameter field is used to specify a particular operational mode to be executed by the channel unit.

COMMAND-RESPONSE BYTE STRUCTURE

The structure of a DS0 byte in which the communication protocol of the present invention is embedded is illustrated in FIG. 7. Bit 1, the most significant (MSB) and first transmitted bit of the byte, is a DDS subrate framing (SF) bit, and is treated as a don't care bit for a command or parameter byte. The subrate framing bit is not used to allow command and response propagation through subrate multiplex equipment of the network.

The second bit, a next sequence bit (NSB), is employed to properly sequence command and data codes during message transmission. For normal transmissions, the NSB alternates between the values 0 and 1 in successive code byte of a command or response frame. For this purpose, the test system controller preferably maintains a next send variable which is inserted as the NSB of a transmitted command frame byte. This one bit variable is initialized at 0 at the beginning of a command message frame and is thereafter incremented modulo-two after the transmission of each code byte. In a similar manner the channel unit maintains a next receive variable which is inserted as the NSB of a response frame data byte. This one bit variable is initialized at 0 at the beginning of a response message frame and is thereafter incremented modulo-two on the reception of each command frame byte. By comparing the received NSB with the NS in the case of the TSC, and NR value, in the case of the channel unit, the device receiver can detect whether a code byte is a duplicate, invalid or out of sequence.

Bits 3–7 of the byte structure of FIG. 7 contain hexadecimal commands or data in the range of 00–1D. The value 1F obviously cannot be used, since it occurs in an ALL '1'S byte. The value 1E is reserved for use as an error response from a channel unit for invalid commands and/or parameter data. Finally, bit 8 is a DDS network control bit, used by the network during normal operation for control and secondary channel data. Bit 8 is always set to the value '1' for command and response messages, in order to minimize potential interference with the operation of other network devices.

EXAMPLE

TABLE 1 illustrates an example of a communication sequence between the test system controller and a selected channel unit, beginning with the test system controller transmitting a control link establishment sequence (phase 1) and ending with the test system controller terminating the control link following a successful exchange of command and response messages during an active session (phase 2) with the selected channel unit. For purposes of simplifying the tabulation, the selected channel unit is channel unit 22 located in hub 20, relative to test system controller 25, rather than channel unit 41 identified as the destination channel unit during the previous description, so that the link establishment sequence will not include the transmission of any 'go transparent' code sets. For the present example, test system controller 25 transmits only the control link establishment code set TIP - ADC - LBE - FEV as the control link establishment sequence. Upon receiving the terminal code byte of the control link establishment sequence—the FEV code byte, the channel unit returns that code byte to inform the test system controller that the control link has been established, so that the test system controller may now begin transmitting command messages to the channel unit.

Table 1 shows three respectively different command messages: 1- a 'READ DEVICE TYPE' message, 2- a 'READ STATUS' message, and 3-a 'WRITE CONFIGURATION' message, which are sequentially transmitted from the test system controller to the channel unit and in response to which the channel unit returns three respective response messages. The first two command messages (READ DEVICE TYPE, READ STATUS) are used to interrogate the channel unit, while the third message (WRITE CONFIGURATION) is used to remotely provision the channel unit. At the completion of the third message exchange, the test system controller terminates the communication path by transmitting a TIP sequence, which aborts the path with the selected channel unit, as described previously. The TIP code is typically repeatedly transmitted for some prescribed period of time (e.g. a minimum of two seconds).

TABLE 1

| OPERATION | TRANSMITTED TSC CODE | CHANNEL UNIT (CU) ACTION |
|---|---|---|
| ESTABLISH TSC-CHANNEL UNIT COMMUNICATION LINK | (40) S0111010 → | TSC sends TIPs |
| | (40) S1101100 → | TSC sends ADCs |
| | (120) S1010110 → | TSC sends LBEs |
| | (40) S1011010 → | TSC sends FEVs |
| | ← S1011010 | CU response FEVs |
| READ DEVICE TYPE | (40) S1111111 → | TSC sends SOM |
| | ← S1111111 | code to begin command message |
| | (40) S0000001 → | TSC sends command type request. |
| | ← S1000011 | Channel unit response type = DSODP |
| | (40) S1111111 → | TSC sends EOM code |
| | ← S1111111 | to terminate command msg. |
| READ STATUS | (40) S1111111 → | TSC sends SOM to |
| | ← S1111111 | begin command message |
| | (40) S0001001 → | TSC sends command type |
| | ← S1001001 | CU sends response |
| | (40) S10000001 → | TSC selects register 0 |
| | ← S00AAAA1 | CU sends A=reg 0 data |
| | (40) S0000101 → | TSC selects register 2 |
| | ← S10BBBB1 | CU sends B=reg 2 data |
| | (40) S1111111 → | TSC sends EOM |
| | ← S1111111 | CU response DMI |
| WRITE CONFIGURATION | (40) S1111111 → | TSC sends SOM to |
| | ← S1111111 | begin command message |
| | (40) S0010001 → | TSC sends command type |
| | ← S1010001 | CU sends response |
| | (40) S1000001 → | TSC selects configuration |
| | ← S0000001 | register 0 for write |
| | (40) S00DDDD1 → | TSC sends write data=D |
| | ← S10DDDD1 | CU saves data and sends response. |
| | (40) S1111111 → | TSC sends EOM |
| | ← S1111111 | CU response DMI |
| TSC-CHANNEL UNIT PATH | (40) S0111010 → | TSC sends TIPs CU returns to normal operation. |

Set forth below is a set of illustrative examples of the specific byte structures of commands (including those set forth in Table 1), that may be employed for interrogating and provisioning channel units in the respective OCU data port and DS0 data port equipment described in the above referenced co-pending patent applications. It is to be observed, however, that the various codes and definitions presented here are not limited to these particular definitions, but may be tailored to conform with the particular types of channel units distributed throughout the network.

TSC COMMANDS

The command types (C4-C0) are binary encoded in the DS0 byte structure in bits 3–7.

| DS0 BYTE BITS: | 1 | 2 | 3 | 4 | 5 | 6 | 7 | 8 |
|---|---|---|---|---|---|---|---|---|
| COMMAND TYPE: | S | NSB | C4 | C3 | C2 | C1 | C0 | 1 |

The following table lists various types of commands that may be employed in accordance with the present invention. Definitions of each command are set forth below, and its associated response.

| COMMAND | CODE: (C4–C0) |
|---|---|
| READ DEVICE TYPE | 00000 |
| READ PART NUMBER | 00001 |
| READ REVISION NUMBER | 00010 |
| READ SERIAL NUMBER | 00011 |
| READ CLEI CODE | 00100 |
| READ STATUS | 00101 |
| SUPERVISORY CONTROL | 00110 |
| READ CONFIGURATION | 00111 |
| WRITE CONFIGURATION | 01000 |
| ERROR RESPONSE CODE (1E) | 11110 |

In the code byte descriptions, the following bit definitions apply:

bit 1, S=Network DDS Subrate Framing bit.

bit 2, NS=Next-Send sequence bit.
    NR=Next-Receive sequence bit expected.

| bits: | 1 | 2 | 3 | 4 | 5 | 6 | 7 | 8 |
|---|---|---|---|---|---|---|---|---|
| READ DEVICE TYPE | | | | | | | | |
| command: | S | NS | 0 | 0 | 0 | 0 | 0 | 1 |
| response: | S | NR | T1 | T2 | T3 | T4 | T5 | 1 | where: T1–T5 (00-1D) define the type of channel unit, such as an OCU data port or a DS0 data port referenced above.
    For example,
    00000    CU OCU-DP
    00001    CU DS0-DP

READ PART NUMBER

| | | | | | | | | |
|---|---|---|---|---|---|---|---|---|
| command: | S | NS | 0 | 0 | 0 | 0 | 1 | 1 |
| response: | S | NR | 0 | 0 | 0 | 0 | 1 | 1 |
| select: | S | NS | S1 | S2 | S3 | S4 | S5 | 1 |
| response: | S | NR | 0 | R1 | R3 | R3 | R4 | 1 | where:

bits S1–S5 (00–1D) select the nibble of a hexadecimal encoded ASCII character; bits R1–R4 are reported in the response message The part number response field is terminated with a "null" character (00 hexadecimal) to signify end of character string.

| S1–S5 | R1–R4 |
|---|---|
| 00000 | Part number, digit 1, (high nibble) |
| 00001 | Part number, digit 1, (low nibble) |
| . | |
| . | |
| . | |
| 11010 | Part number, digit N, (high nibble) |
| 11011 | Part number, digit N, (low nibble) |
| 11100 | 0000, "null" character |
| 11101 | 0000 |

READ REVISION NUMBER

| bits: | 1 | 2 | 3 | 4 | 5 | 6 | 7 | 8 |
|---|---|---|---|---|---|---|---|---|
| command: | S | NS | 0 | 0 | 0 | 1 | 0 | 1 |
| response: | S | NR | 0 | 0 | 0 | 1 | 0 | 1 |
| select: | S | NS | 0 | 0 | S1 | S2 | S3 | 1 |
| response: | S | NR | 0 | R1 | R2 | R3 | R4 | 1 | where:

bits S1–S3 (00–07) select the nibble of a hexadecimal encoded ASCII character, bits R1–R4 are reported in the response message.

The revision number response field is terminated with a "null" character (00 hexadecimal) to signify end of a character string.

| S1–S3 | R1–R4 |
|---|---|
| 000 | Revision number, digit 1, (high nibble) |
| 001 | Revision number, digit 1, (low nibble) |
| . | |
| . | |
| 100 | Revision number, digit N, (high nibble) |
| 101 | Revision number, digit N, (low nibble) |
| 110 | 0000, "null" character |
| 111 | 0000 |

READ SERIAL NUMBER

| bits: | 1 | 2 | 3 | 4 | 5 | 6 | 7 | 8 |
|---|---|---|---|---|---|---|---|---|
| command: | S | NS | 0 | 0 | 0 | 1 | 1 | 1 |
| response: | S | NR | 0 | 0 | 0 | 1 | 1 | 1 |
| select: | S | NS | S1 | S2 | S3 | S4 | S5 | 1 |
| response: | S | NR | 0 | R1 | R2 | R3 | R4 | 1 | where:

bits S1–S5 (00–1D) select the nibble of a hexadecimal encoded ASCII character; bits R1–R4 are reported in the response message.

| S1–S5 | R1–R4 |
|---|---|
| 00000 | Serial number, digit 1, (high nibble) |
| 00001 | Serial number, digit 2, (low nibble) |
| . | |
| . | |
| 11010 | Serial number, digit N, (high nibble) |
| 11011 | serial number, digit N, (low nibble) |
| 11100 | 0000, "null" character |
| 11101 | 0000 |

READ CLEI CODE

| bits: | 1 | 2 | 3 | 4 | 5 | 6 | 7 | 8 |
|---|---|---|---|---|---|---|---|---|
| command: | S | NS | 0 | 0 | 1 | 0 | 0 | 1 |
| response: | S | NR | 0 | 0 | 1 | 0 | 0 | 1 |
| select: | S | NS | S1 | S2 | S3 | S4 | S5 | 1 |
| response: | S | NR | 0 | c1 | c2 | c3 | c4 | 1 | where:

bits S1–S4 select one of CLEI ASCII character nibbles (0–19) to be sent by the selected channel unit in bits c1–c4 of its response message.

| S1–S5 | c1–c4 |
|---|---|
| 00000 | CLEI number, character 1, (high nibble) |
| 00001 | CLEI number, character 1, (low nibble) |
| . | |
| . | |
| 10010 | CLEI number, character 10, (high nibble) |
| 10011 | CLEI number, character 10, (low nibble) |
| 10100 | 0000, "null" character |
| 10101 | 0000 |

SUPERVISORY CONTROL

| bits: | 1 | 2 | 3 | 4 | 5 | 6 | 7 | 8 |
|---|---|---|---|---|---|---|---|---|
| command: | S | NS | 0 | 0 | 1 | 1 | 0 | 1 |
| response: | S | NR | 0 | 0 | 1 | 1 | 0 | 1 |
| control: | S | NS | C1 | C2 | C3 | C4 | C5 | 1 |
| response: | S | NR | C1 | C2 | C3 | C4 | C5 | 1 | where:

C1–C5 (00–1D) are encoded supervisory commands.
CLEAR NEW DEVICE STATE (C1–C5=00000)
  Resets the "New Device State" status bit to (0=off).
CLEAR STATUS REPORT (C1–C5=00001)
  Performs a clear function on device status bits reported in response to a READ STATUS command message.
SELF-DIAGNOSTICS TEST (C1–C5=00010)
  Requests the selected channel unit to perform a self-diagnostics test. Self-diagnostics test results are available with READ STATUS command.
RESET DEVICE (C1–C5=00011)
  The RESET DEVICE command requests the selected channel unit to perform a logical reset operation. The reset operation will result in the channel unit executing a sequence equivalent to a power-up reset. Preferably the selected channel unit is configured to perform the reset operation after a (0.5 second) delay, to allow the TSC to receive the response from the channel unit for command acknowledgment. After a delay, the TSC sends a "terminate control" sequence to insure other channel units in the network return to normal operation.

READ STATUS

| bits: | 1 | 2 | 3 | 4 | 5 | 6 | 7 | 8 |
|---|---|---|---|---|---|---|---|---|
| command: | S | NS | 0 | 0 | 1 | 0 | 1 | 1 |
| response: | S | NR | 0 | 0 | 1 | 0 | 1 | 1 |
| select: | S | NS | S1 | S2 | S3 | S4 | S5 | 1 |
| response: | S | NR | 0 | D1 | D2 | D3 | D4 | 1 | where:

bits S1–S5 (00–1D) select a status nibble to be sent by the selected channel unit in data bits D1–D4, of its response message. Respective status registers that may be employed in each of the above-referenced OCU data port and DS0 data port type channel units and their associated functions are set forth below. It should be noted that the status registers listed and the information contained within these registers is not limited to the specific register functions and code values listed, but may be augmented or modified to meet particular device type requirements.

OCU-DP STATUS REGISTERS

STATUS REGISTER (S1–S5: 00000) - OPERATION

| | |
|---|---|
| D1-0 | spare |
| D2-SDP | Self-Diagnostics Passed (1=on) |
| D3-SDF | Self-Diagnostics Failed (1=on) |
| D4-NDS | New Device State (1=on) |

STATUS REGISTER (S1–S5: 00001) - ALARMS

| | |
|---|---|
| D1-EPF | Non-volatile Memory Failure (1=on) |
| D2-CFGI | Configuration Invalid (1=invalid) |
| D3-0 | spare |
| D4-0 | spare |

STATUS REGISTER (S1–S5: 00010) - PERFORMANCE MONITOR

| | |
|---|---|
| D1-TOF | T1 Out of Frame (1=RNDIS LOW, 0=RNDIS HIGH) |
| D2-LSC | Loop Sealing Current (1=active) |
| D3-LRS | Loop Receive Signal (1=active) |
| D4-CRT | Customer Remote Test Code Event (1=on) |

CRT Code Event bit is set upon detection of Local Loop Code (*010X0V) from customer. The detection criteria require consecutive codes greater than prescribed maximum count or time period.

STATUS REGISTER (S1–S5: 00011) - PERFORMANCE MONITOR

| | |
|---|---|
| D1-0 | spare |
| D2-0 | spare |
| D3-0 | spare |
| D4-IDL | Idle Loop Circuit (1=idle, 0=active) |

STATUS REGISTER (S1–S5:1 00100) - PERFORMANCE MONITOR

| | |
|---|---|
| D1-RL7 | Receive Signal Loss db, upper nibble (RL7–RL4) |
| D2-RL6 | |
| D3-RL5 | |
| D4-RL4 | |

STATUS REGISTER (S1–S5: 00101) - PERFORMANCE MONITOR

| | |
|---|---|
| D1-RL3 | Receive Signal Loss db, lower nibble (RL3–RL0) |
| D2-RL2 | |
| D3-RL1 | |
| D4-RL0 | |

The Receive Signal Loss is a binary encoded value with the format:

For RL7=0: Loss in db=value (RL6-RL0).

For RL7=1: Loss in db>value (RL6-RL0).

This encoding format allows the channel unit to report its value based upon its measurement capability.

STATUS REGISTER (S1–S5: 00110) - BIPOLAR VIOLATION ERRORS

| | |
|---|---|
| D1-BV7 | (HIGH NIBBLE COUNT) |
| D2-BV6 | |
| D3-BV5 | |
| D4-BV4 | |

STATUS REGISTER (S1–S5: 00111) - BIPOLAR VIOLATION ERRORS

| | |
|---|---|
| D1-BV3 | (LOW NIBBLE COUNT) |
| D2-BV2 | |
| D3-BV1 | |
| D4-BV0 | |

Bipolar Violation Error Count is the total number of Bipolar Violation Code errors since the last CLEAR STATUS REPORT command. (The count freezes at "FF" until cleared.)

STATUS REGISTER (S1–S5: 01000) - T1 OOF COUNT (HIGH NIBBLE)

D1-TC7
D2-TC6
D3-TC5
D4-TC4

STATUS REGISTER (S1–S5: 01001) - T1 OOF COUNT (LOW NIBBLE)

D1-TC3
D2-TC2
D3-TC1
D4-TC0

T1 Out-Of-Frame COUNT is the total number of detected RNDIS LOW events since a CLEAR STATUS REPORT command was last received. (The counter freezes at count "FF" until cleared.)

DS0-DP STATUS REGISTERS

STATUS REGISTERS (S1–S5: 00000) - OPERATION

| | |
|---|---|
| D1-0 | spare |
| D2-SDP | Self-Diagnostics Passed (1=on) |
| D3-SDF | Self-Diagnostics Failed (1=on) |
| D4-NDS | New Device (1=on) |

STATUS REGISTER (S1–S5: 00001) - ALARMS

| | |
|---|---|
| D1-EPF | Non-volatile Memory Failure (1=on) |
| D2-CFGI | Configuration Invalid (1=invalid) |
| D3-0 | spare |
| D4-0 | spare |

STATUS REGISTER (S1–S5: 00010) - PERFORMANCE MONITOR

| | |
|---|---|
| D1-0 | spare |
| D2-0 | spare |
| D3-TOF | T1 Out of Frame (1=RNDIS LOW, 0=RNDIS HIGH) |
| D4-AZD | All-Zeros Detected on Drop Size (1=on) |

AZD is "latched" status bit set when an all zero condition is detected on the Drop Side DS0 channel.

STATUS REGISTER S1–S5: 00011) - PERFORMANCE MONITOR

| | |
|---|---|
| D1-0 | spare |
| D2-0 | spare |
| D3-0 | spare |
| D4-0 | spare |

STATUS REGISTER (S1–S5: 00100) - T1 OOF COUNT (HIGH NIBBLE)

D1-TC7
D2-TC6
D3-TC5
D4-TC4

STATUS REGISTER (S1–S5: 00101) - T1 OOF COUNT (LOW NIBBLE)

D1-TC3
D2-TC2
D3-TC1
D4-TC0

T1 Out-of-Frame COUNT is the total number of detected RNDIS LOW events since a CLEAR STATUS REPORT command was last received. (The counter freezes at count "FF" until cleared.)

DEVICE PROVISIONING

Provisioning commands provide remote control and monitor of a channel unit's network operational state following its power-up sequence. Typically, each type of channel unit will have different configuration options and requirements. This device-dependent information is organized in a configuration region of memory within the channel unit's micro-controller and accessible with READ CONFIGURATION and WRITE CONFIGURATION commands.

READ CONFIGURATION

| bits: | 1 | 2 | 3 | 4 | 5 | 6 | 7 | 8 |
|---|---|---|---|---|---|---|---|---|
| command: | S | NS | 0 | 0 | 1 | 1 | 1 | 1 |
| response: | S | NR | 0 | 0 | 1 | 1 | 1 | 1 |
| select: | S | NS | S1 | S2 | S3 | S4 | S5 | 1 |
| response: | S | NR | 0 | D1 | D2 | D3 | D4 | 1 | where:

bits S1–S5 (00–1D) select the configuration nibble to be returned in a response message from the channel unit. The selected configuration nibble is contained in bits D1–D4 of the response message.

WRITE CONFIGURATION (PROVISION DEVICE)

| bits: | 1 | 2 | 3 | 4 | 5 | 6 | 7 | 8 |
|---|---|---|---|---|---|---|---|---|
| command: | S | NS | 0 | 1 | 0 | 0 | 0 | 1 |
| response: | S | NR | 0 | 1 | 0 | 0 | 0 | 1 |
| select: | S | NS | S1 | S2 | S3 | S4 | S5 | 1 |
| response: | S | NR | S1 | S2 | S3 | S4 | S5 | 1 |
| data: | S | NS | 0 | D1 | D2 | D3 | D4 | 1 |
| response: | S | NR | 0 | D1 | D2 | D3 | D4 | 1 | where:

bits S1–S5 (00–1D) select the provision register to be written with the configuration information contained in the following data code, bits D1–D4.

The provision register data, D1–D4 is stored by the channel unit in non-volatile memory.

Respective provision registers that may be employed in the above-referenced OCU-data port and DS0 data port channel units, and their associated functions are set forth below. Also, as in the case of the status register definition set forth above, the provision registers listed and the information contained within these provision registers is not limited to the specific register functions and code values listed, but may be augmented or modified to meet particular device type requirements.

OCU-DP PROVISION REGISTERS

PROVISION REGISTER (S1–S5: 00000) - STATE

| | | |
|---|---|---|
| D1-OOS | Out-Of-Service (1=OOS, 0=INS) | |
| D2-RPV | Configuration (1=REMOTE, 0=LOCAL switch options) | |
| D3-0 | spare | |
| D4-ENH | Enhanced SWITCHED 56 (1=on) | |

PROVISION REGISTER (S1–S5: 00001) - MODE

| | | |
|---|---|---|
| D1-CRT | Customer Remote Test (1=on) | |
| D2-CSU | Customer Service Unit (1=on) | |
| D3-B1 | BANK SELECTION (B1,B0) | |
| D4-B0 | 00 - D4 BANK | |
| | 01 - SLC I/III | |
| | 10 - SLC II | |

PROVISION REGISTER (S1–S5: 00010) - RATE

| | | |
|---|---|---|
| D1-EC | Error Correction (1=on) | |
| D2-R2 | RATE (R2,R1,R0) | |
| D3-R1 | 000 - 2.4 kbps | 100 - 38.4 kbps |
| D4-R0 | 001 - 4.8 kbps | 101 - 56 kbps |
| | 010 - 9.6 kbps | 110 - Switch 56 kbps |
| | 011 - 19.2 kbps | 111 - 64 kbps |

PROVISION REGISTER (S1–S5: 00011) - OPTIONS

| | | |
|---|---|---|
| D1-ETR | Extended Range Option (1=on) | |
| D2-SC | Secondary Channel (1=on) | |
| D3-ZS | Zero Suppression (1=on) | |
| D4-LL | Latching Loopback Enable (1=on) | |

DSO-DP PROVISION REGISTERS

PROVISION REGISTER (S1–S5: 00000) - STATE

| | | |
|---|---|---|
| D1-OOS | Out-Of-Service (1=OOS, 0=INS) | |
| D2-RPV | Configuration (1=REMOTE, 0=LOCAL switch options) | |
| D3-0 | spare | |
| D4-0 | spare | |

PROVISION REGISTER (S1–S5: 00001) - MODE

| | | |
|---|---|---|
| D1-0 | spare | |
| D2-0 | spare | |
| D3-B1 | BANK SELECTION (B1,B0) | |
| D4-B0 | 00 - D4 BANK | |
| | 01 - SLC I/III | |
| | 10 - SLC II | |

PROVISION REGISTER (S1–S5: 00010) - RATE

| | | |
|---|---|---|
| D1-EC | Error correction (1=on) | |
| D2-R2 | RATE (R2,R1,R0) | |
| D3-R1 | 000 - subrate | 100 - 38.4 kbps |
| D4-R0 | 001 - spare | 101 - 56 kbps |
| | 010 - spare | 110 - Switch 56 kbps |
| | 011 - 19.2 kbps | 111 - 64 kbps |

PROVISION REGISTER (S1–S5: 00011) - OPTIONS

| | | |
|---|---|---|
| D1-0 | spare | |
| D2-0 | spare | |
| D3-ZS | Zero Suppression (1=on) | |
| D4-LL | Latching Loopback Enable (1=on) | |

As will be appreciated from the foregoing description, the present invention, rather than effecting a wholesale replacement of existing equipment within the channel bank, takes advantage of the digital communication capabilities of the channel units described in the above referenced patent applications, by equipping such channel units with the ability to be remotely interrogated and provisioned through a virtual control link that is established over a tandem communication path between a test system controller at an interrogation site and the selected channel unit, using a modified set of inband digital code sequences that are customarily employed for effecting a latching loopback condition. The format of the control link establishment sequence is such that, as it is forwarded down the link, any channel unit or units that are intermediate the test system controller and the destination channel unit will transition to a transparent state. This communication transparency of such intermediate units will allow a control link establishment code set within the overall control link establishment sequence to propagate down the link to the destination channel unit, so that only the destination channel unit will be able transition to an interrogation, response mode. During the command-response mode, channel units intermediate the selected channel unit and the interrogating test system controller continue to assume a transparent state, so that command and response messages propagate unmodified through such intermediate channel units. A command message may contain information for defining the operational configuration of the selected channel unit. It may be used to read the operational configuration or status of the selected channel unit, or it may contain supervisory control information for directing the selected channel unit to conform with a prescribed operational condition.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A communication method comprising the steps of:
   (a) transmitting a communication link establishment sequence of respectively different in-band digital code bytes, from a first device at a first site, over a digital communications link, along which a plurality of second devices are sequentially distributed in tandem at a plurality of second sites served by said digital communications link, said sequence being defined so as to identify a selected one of said plurality of second devices;
   (b) in response to said sequence of respectively different in-band digital code bytes, transmitted in step (a) from said first device having identified said selected one of said plurality of second devices, causing said selected one of said plurality of second devices to establish a communication link with said first device at said first site; and
   (c) having established said communication link between said selected one of said plurality of second devices and said first device in step (b), transmitting a digital message from said first device at said first site over said established communication link to said selected second device, the contents of said digital message being exclusive of any of said in-band digital code bytes and being effective to cause said selected second device to perform a prescribed task which, upon being completed, will cause said first device to have knowledge of the operational configuration of said selected second device.

2. A method according to claim 1, wherein step (c) comprises transmitting a digital message which is effective to interrogate said selected second device.

3. A method according to claim 1, wherein step (c) comprises transmitting a digital message which is effective to provision said selected second device with one or more prescribed operational parameters.

4. A method according to claim 1, wherein step (c) comprises transmitting a digital message which is effective to specify a prescribed operational mode to be executed by said selected second device.

5. A method according to claim 1, wherein one of said respectively different in-band digital code bytes is a bit pattern that is suppressed in normal digital communications.

6. A method according to claim 1, wherein a first of said respectively different in-band digital code bytes corresponds to a transition in progress bit pattern that causes a respective second device receiving said transition in progress bit pattern to transition to an idle state, in which the receiving second device is awaiting a second of said respectively different in-band digital code bytes to be transmitted thereto.

7. A method according to claim 6, wherein said second of said respectively different in-band digital code bytes corresponds to an alert device bit pattern that causes a second device receiving said alert device bit pattern to transition from said idle state to an alert device state, in which the receiving second device is awaiting transmission of a third of said respectively different in-band digital code bytes.

8. A method according to claim 7, wherein said third of said respectively different in-band digital code bytes corresponds to a loopback enable bit pattern that is suppressed in normal digital communications.

9. A method according to claim 7, wherein a fourth of said respectively different in-band digital code bytes corresponds to a far end voice bit pattern that causes a second device receiving said far end voice bit pattern to transition to a state in which the receiving second device is ready to receive a command message from said first device.

10. A method according to claim 7, wherein a fourth of said respectively different in-band digital code bytes corresponds to a far end voice bit pattern that causes a second device receiving said far end voice bit pattern to loop said fourth of said respectively different in-band digital code bytes back to said first device to confirm establishment of an in-band communications link between said receiving second device and said first device.

11. A method according to claim 1, further including the step of (d) providing an indication at said selected second device that said first device has transmitted a digital message in step (c) which is effective to establish a parameter of said selected second device.

12. A method according to claim 3, further including the step of (d) providing an indication at said selected second device that said first device has transmitted a digital message in step (c) which is effective to provision said selected second device.

13. An arrangement for conducting digital communications between a first device located at a first site and a selected one of a plurality of second devices sequentially distributed in tandem at a plurality of second sites along a digital communications link, comprising:
   a digital communications transmitter contained in said first device, and being operative to transmit a communication link establishment sequence of respectively different in-band digital code bytes over said digital communications link, said sequence being defined so as to identify a selected one of said plurality of second devices;
   a plurality of respective digital communications receivers contained in respective ones of said plurality of second device, each respective receiver being operative to monitor said digital communications link for said sequence of in-band digital code bytes and, in response to receipt of said sequence of respectively different in-band digital code bytes transmitted from said transmitter in said first device, establishing a communication link with said first device at said first site; and wherein
   said transmitter at said first device is operative, in response to the respective receiver of said selected one of said second devices having established said communication link with said first device, to transmit a digital message over said established communication link to said selected second device, the contents of said digital message being exclusive of any of said in-band digital code bytes and being defined so as to cause said selected second device to perform a prescribed task which, upon being completed, will cause said first device to have knowledge of the operational configuration of said selected second device.

14. An arrangement according to claim 13, wherein the contents of said digital message are effective to interrogate said selected second device.

15. An arrangement according to claim 13, wherein the contents of said digital message are effective to provision said selected second device with one or more prescribed operational parameters.

16. An arrangement according to claim 13, wherein the contents of said digital message are effective to specify a prescribed operational mode to be executed by said selected second device.

17. An arrangement according to claim 13, wherein one of said respectively different in-band digital code bytes is a bit pattern that is suppressed in normal digital communications.

18. An arrangement according to claim 13, wherein a first of said respectively different in-band digital code bytes corresponds to a transition in progress bit pattern, that causes a respective second device receiving said transition in progress bit pattern to transition to an idle state, in which the receiving second device is awaiting a second of said respectively different in-band digital code bytes to be transmitted thereto.

19. An arrangement according to claim 18, wherein said second of said respectively different in-band digital code bytes corresponds to an alert device bit pattern that causes a second device receiving said alert device bit pattern to transition from said idle state to an alert device state, in which the receiving second device is awaiting transmission of a third of said respectively different in-band digital code bytes.

20. An arrangement according to claim 19, wherein said third of said respectively different in-band digital code bytes corresponds to a loopback enable bit pattern that is suppressed in normal digital communications.

21. An arrangement according to claim 20, wherein a fourth of said respectively different in-band digital code bytes corresponds to a far end voice bit pattern, that causes a second device receiving said far end voice bit pattern to transition to a state in which the receiving second device is ready to receive a command message from said first device.

22. An arrangement according to claim 20, wherein a fourth of said respectively different in-band digital code bytes corresponds to a far end voice bit pattern that causes a second device receiving said far end voice bit pattern to loop said fourth of said respectively different in-band digital code bytes back to said first device to confirm establishment of an in-band communications link between said receiving second device and said first device.

23. An arrangement according to claim 13, wherein the receiver at said selected second device is operative to cause said second device to provide an indication that a digital message has been transmitted thereto from said first device, which digital message is effective to establish a parameter of said selected second device.

24. An arrangement according to claim 13, wherein the receiver at said selected second device is operative to cause said second device to provide an indication that a digital message has been transmitted thereto, which digital message is effective to provision said selected second device.

25. A method of conducting communications between an access device located at a first site and a selected one of plurality of channel units sequentially distributed in tandem at a plurality of second sites along a digital communications link, each channel unit being capable of being remotely provisioned by said access device at said first site, and providing performance information, in response to being interrogated from said access device at said first site, comprising the steps of:

(a) transmitting, from said access device over said communication link to channel units distributed therealong, a communication link establishment sequence that is comprised of respectively different in-band digital code bytes which are effective to identify a selected one of said plurality of channel units;

(b) in response to said sequence of respectively different in-band digital code bytes transmitted from said access device in step (a) having identified said selected one of said plurality of channel units, causing said selected one of said plurality of channel units to establish a communication link with said access device at said first site; and (c) having established said communication link between said selected one of said plurality of channel units and said access device in step (b), conducting a command and response digital message exchange between said access device and said selected channel unit over said established communication link between access device and said selected channel unit, said command and response digital message exchange including a command message exclusive of any of said in-band digital code bytes and being effective to cause selected channel unit to perform a prescribed task that, upon being completed, will provide a response message to said access device representative of the operational configuration of said selected channel unit.

26. A method according to claim 25, wherein step (c) comprises transmitting a digital command message which is effective to interrogate said selected channel unit to derive status information therefrom in said response message.

27. A method according to claim 25, wherein step (c) comprises transmitting a digital command message which is effective to interrogate said selected channel unit to access performance information therefrom in said response message.

28. A method according to claim 25, wherein step (c) comprises transmitting a digital command message which is effective to provision said selected channel unit with one or more prescribed operational parameters.

29. A method according to claim 25, wherein step (c) comprises transmitting a digital command message which is effective to specify a prescribed operational mode to be executed by said selected channel unit.

30. A method according to claim 25, wherein one of said respectively different in-band digital code bytes is a bit pattern that is suppressed in normal digital communications.

31. A method according to claim 25, wherein a first of said respectively different in-band digital code bytes corresponds to a transition in progress bit pattern that causes a respective channel unit receiving said transition in progress bit pattern to transition to an idle state, in which the receiving channel unit is awaiting a second of said respectively different in-band digital code bytes to be transmitted thereto.

32. A method according to claim 31, wherein said second of said respectively different in-band digital code bytes corresponds to an alert device bit pattern that causes a channel unit receiving said alert device bit pattern to transition from said idle state to an alert device state, in which the receiving channel unit is awaiting transmission of a third of said respectively different in-band digital code bytes.

33. A method according to claim 32, wherein said third of said respectively different in-band digital code bytes corresponds to a loopback enable bit pattern that is suppressed in normal digital communications.

34. A method according to claim 32, wherein a fourth of said respectively different in-band digital code bytes corresponds to a far end voice bit pattern that causes a channel unit receiving said far end voice bit pattern to transition to a state in which the receiving channel unit is ready to receive a command message from said access device.

35. A method according to claim 32, wherein a fourth of said respectively different in-band digital code bytes corresponds to a far end voice bit pattern that causes a channel unit receiving said far end voice bit pattern to loop said fourth of said respectively different in-band digital code bytes back to said access device to confirm establishment of an in-band communications link between said receiving channel unit and said access device.

36. A method according to claim 25, further including the step of (d) providing an indication at said selected channel unit that said access device transmitted a digital command message in step (c) which is effective to establish a parameter of said selected channel unit.

37. A method according to claim 25, further including the step of (d) providing an indication at said selected channel unit that said access device has transmitted a digital command message in step (c) which is effective to provision said selected channel unit.

\* \* \* \* \*